(12) United States Patent
Nakajima

(10) Patent No.: US 11,309,566 B2
(45) Date of Patent: Apr. 19, 2022

(54) ELECTROLYTE SOLUTION TANK FOR REDOX FLOW BATTERY AND REDOX FLOW BATTERY SYSTEM

(71) Applicant: DENSO CORPORATION, Kariya (JP)

(72) Inventor: Atsushi Nakajima, Kariya (JP)

(73) Assignee: DENSO CORPORATION, Kariya (JP)

( * ) Notice: Subject to any disclaimer, the term of this patent is extended or adjusted under 35 U.S.C. 154(b) by 456 days.

(21) Appl. No.: 15/960,970

(22) Filed: Apr. 24, 2018

(65) Prior Publication Data

US 2018/0342753 A1 Nov. 29, 2018

(30) Foreign Application Priority Data

May 24, 2017 (JP) .............................. JP2017-103077

(51) Int. Cl.
*H01M 8/18* (2006.01)
*H01M 8/04186* (2016.01)
*H01M 8/04082* (2016.01)

(52) U.S. Cl.
CPC ....... *H01M 8/188* (2013.01); *H01M 8/04186* (2013.01); *H01M 8/04201* (2013.01); *H01M 2250/20* (2013.01)

(58) Field of Classification Search
None
See application file for complete search history.

(56) References Cited

U.S. PATENT DOCUMENTS

2005/0158615 A1* 7/2005 Samuel ............ H01M 8/04276
429/81

FOREIGN PATENT DOCUMENTS

| JP | H04-004569 A | | 1/1992 | |
| JP | 2000030729 A | * | 1/2000 | |
| JP | 2015-033171 A | | 2/2015 | |
| WO | WO-2018077901 A | * | 5/2018 | ............ H01M 8/188 |

OTHER PUBLICATIONS

Machine translation of JP 2000-030729 A (Year: 2000).*

* cited by examiner

*Primary Examiner* — Robert S Carrico
(74) *Attorney, Agent, or Firm* — Oliff PLC

(57) ABSTRACT

An electrolyte solution tank has a tank body, an electrolyte solution supply part, and electrolyte solution drain part and a flow guide mechanism. The electrolyte solution supply part supplies the electrolyte solution into an interior chamber in the tank body. The electrolyte solution is drained from the tank body to the outside of the tank through the electrolyte solution drain part. The flow guide mechanism is arranged in the interior chamber of the tank body. The flow guide mechanism guides the flow of the electrolyte solution in the interior chamber to the electrolyte solution drain part along a vertically downward direction.

10 Claims, 8 Drawing Sheets

ELECTROLYTE SOLUTION TANK FOR REDOX FLOW BATTERY AND REDOX FLOW BATTERY SYSTEM

CROSS-REFERENCE TO RELATED APPLICATION

This application is related to and claims priority from Japanese Patent Application No. 2017-103077 filed on May 24, 2017, the contents of which are hereby incorporated by reference.

BACKGROUND OF THE INVENTION

1. Field of the Invention

The present invention relates to electrolyte solution tanks for redox flow batteries as a type of rechargeable flow batteries, and further relates to redox flow battery systems using the redox flow batteries.

2. Description of the Related Art

There have been known and used many types of redox flow battery systems. For example, a type of the redox flow battery systems consists of one or more redox flow battery cells, electrolyte solution tanks and a pump assembly. The electrolyte solution tanks store an electrolyte solution. The pump assembly supplies the electrolyte solution from the electrolyte solution tanks to the redox flow battery cell. Those redox flow battery systems are used as installation type power sources. For this reason, it is required to increase an amount of electrolyte solution or to add additional electrolyte solution tanks so as to increase the battery capacity. In addition, such redox flow battery systems are used as power sources to be mounted on electric vehicles and hybrid vehicles. For example, patent document 1, Japanese patent laid open publication No. 2015-33171 has disclosed an in-vehicle type redox flow battery system to be mounted on a vehicle. The in-vehicle type redox flow battery system is equipped with an electrolyte solution main tank and an electrolyte solution sub tank. When rapid consumption of the battery capacity occurs due to a high load operation, the electrolyte solution sub tank starts to supply the electrolyte solution into the battery cells, in addition to supplying the electrolyte solution from the electrolyte solution main tank, so as to maintain the adequate battery capacity.

For example, it is necessary to replace the used electrolyte solution with a fresh one when the used electrolyte solution has deteriorated due to a long use. That is, it is necessary to perform quick replacement of the used electrolyte solution with fresh electrolyte solution when the redox flow battery system is mounted on a vehicle. However, because the in-vehicle type redox flow battery system disclosed in patent document 1 has a conventional structure equipped with the electrolyte solution main tank and the electrolyte solution sub tank which store a large amount of the electrolyte solution, it takes a relatively long period of time to replace the electrolyte solution with the fresh electrolyte solution.

In addition, it is necessary to drain the used electrolyte solution from the redox flow battery system so as to replace the used electrolyte solution with the fresh electrolyte solution in the redox flow battery system. In order to perform the replacement of the used electrolyte solution with the fresh electrolyte solution within a short period of time, it can be considered to drain the used electrolyte solution and to introduce the fresh electrolyte solution simultaneously. However, in the conventional structure of the redox flow battery system disclosed in patent document 1, the used electrolyte solution and the fresh electrolyte solution are mixed together when the used electrolyte solution is drained and the fresh electrolyte solution is introduced simultaneously. This conventional structure reduces the efficiency of electrolyte solution exchange in the redox flow battery system.

SUMMARY

It is therefore desired to provide electrolyte solution tanks to be used in a redox flow battery and a redox flow battery system capable of replacing electrolyte solution with high efficiency within a short period of time.

An exemplary embodiment provides an electrolyte solution tank, a tank body, an electrolyte solution supply part, an electrolyte solution drain part and a flow guide mechanism. The electrolyte solution tank stores electrolyte solution to be supplied into and circulated through a redox flow type battery cell. The tank body has an interior chamber configured to store electrolyte solution. Through the electrolyte solution supply part, the electrolyte solution is supplied into the interior chamber of the tank body. The electrolyte solution drain part drains the electrolyte solution stored in the interior chamber to the outside of the electrolyte solution tank. The flow guide mechanism is arranged in the interior chamber of the tank body. The flow guide mechanism stores the electrolyte solution supplied from the electrolyte solution supply part in the interior chamber of the tank body. The flow guide mechanism further guides the electrolyte solution stored in the interior chamber of the tank body, in a vertically downward direction in the interior chamber of the tank body, into the electrolyte solution drain part.

The electrolyte solution tank has an improved structure in which the flow guide mechanism is arranged in the interior chamber of the drain part. The flow guide mechanism guides the electrolyte solution, supplied from the electrolyte solution supply part, and stored the electrolyte solution in the interior chamber, and guides the electrolyte solution in a vertically downward direction to the electrolyte solution drain part. Even if the draining of the used electrolyte solution and the supplying of the fresh electrolyte solution are performed simultaneously in the electrolyte solution tank, this improved structure of the electrolyte solution tank makes it possible to smoothly perform the replacement of the used electrolyte solution with fresh electrolyte solution while preventing the used electrolyte solution and the fresh electrolyte solution from being mixed together.

The present invention provides an electrolyte solution tank to be applied to redox flow type batteries, and a redox flow battery system using the electrolyte solution tank capable of speedily replacing the electrolyte solution with fresh electrolyte solution within a short period of time.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
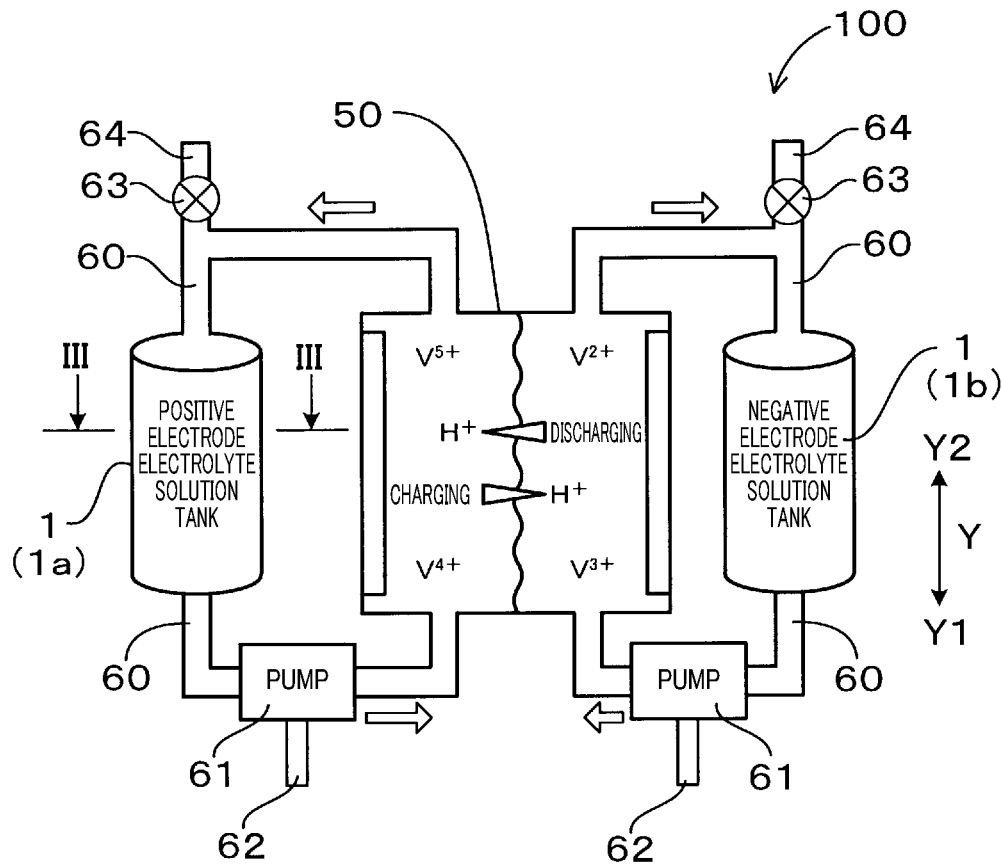
FIG. 1 is a conceptual view showing a structure of a redox flow battery system according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of a structure of electrolyte solution tanks 1 (1a, 1b) used in a redox flow battery in a redox flow battery system 100 according to a first exemplary embodiment with reference to FIG. 1 to FIG. 8.

FIG. 1 is a conceptual view showing a structure of the redox flow battery system 100 according to the first exemplary embodiment of the present invention. As shown in FIG. 1, the assembly of the electrolyte solution tanks 1 is composed of a positive electrode electrolyte solution tank 1a and a negative electrode electrolyte solution tank 1b. The positive electrode electrolyte solution tank 1a stores electrode electrolyte solution. The negative electrode electrolyte solution tank 1b stores electrode electrolyte solution. The electrolyte solution in the positive electrode electrolyte solution tank 1a and the negative electrode electrolyte solution tank 1b is circulated in a redox flow type battery cell 50.

Figure 2:
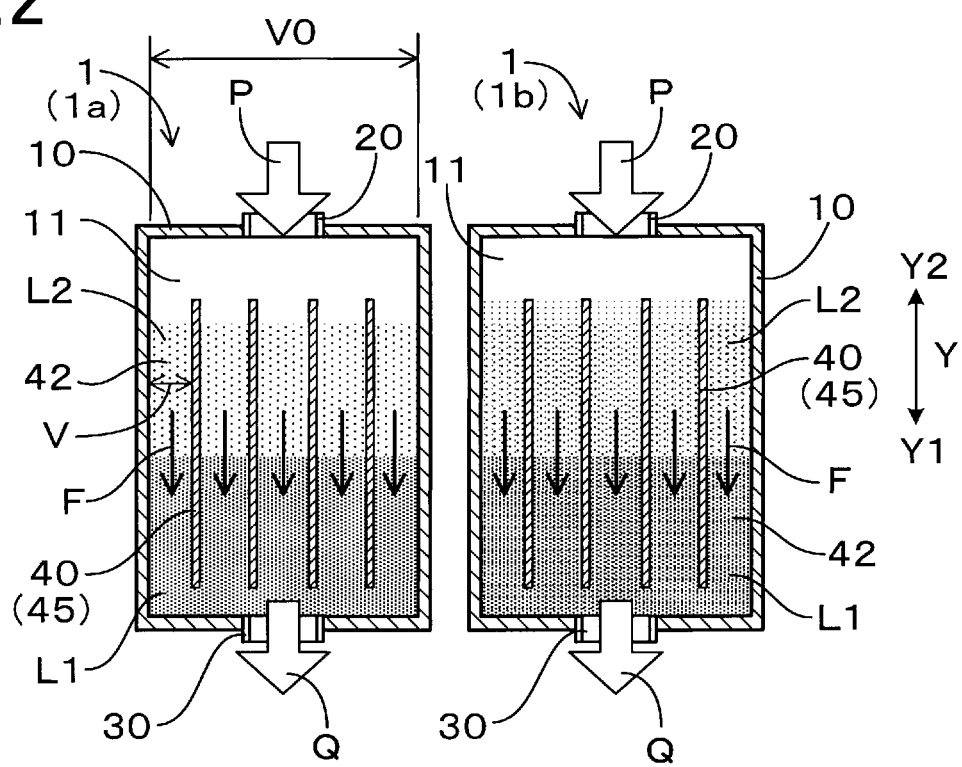
FIG. 2 is a conceptual view showing a longitudinal cross section of electrolyte solution tanks used in a redox flow battery in the redox flow battery system according to the first exemplary embodiment shown in FIG. 1.

FIG. 2 is a conceptual view showing a longitudinal cross section of the positive electrode electrolyte solution tank 1a and the negative electrode electrolyte solution tank 1b for the redox flow battery in the redox flow battery system 100 shown in FIG. 1. As shown in FIG. 2, the electrode electrolyte solution tank 1 (1a, 1b), i.e. each of the positive electrode electrolyte solution tank 1a and the negative electrode electrolyte solution tank 1b has a tank body 10, an electrolyte solution supply part 20, an electrolyte solution drain part 30 and a flow guide mechanism 40.

The tank body 10 is configured to store the electrolyte solution in an interior chamber 11 thereof. The electrolyte solution supply part 20 is configured to supply the electrolyte solution into the interior chamber 11 of the tank body 10. The electrolyte solution drain part 30 is configured to discharge the electrolyte solution stored in the tank body 10.

The flow guide mechanism 40 is arranged in the interior chamber 11 of the tank body 10. The flow guide mechanism 40 guides the electrolyte solution, supplied from the electrolyte solution supply part 20, in a vertically downward direction in the interior chamber 11, i.e. toward the bottom part of the tank body 10, and configured to supply the electrolyte solution to the electrolyte solution drain part 30.

A description will now be given of the detailed structure and behavior of the assembly of the electrolyte solution tanks 1 (1a, 1b), for the redox flow battery, according to the first exemplary embodiment shown in FIG. 1 and FIG. 2. As shown in FIG. 1, the assembly of the electrolyte solution tanks 1 (1a, 1b) is connected to the redox flow type battery cell 50. The assembly of the electrolyte solution tanks 1 (1a, 1b) and the redox flow type battery cell 50 form the redox flow battery system 100. As previously explained and shown in FIG. 1, the assembly of the electrolyte solution tanks 1 has the positive electrode electrolyte solution tank 1a and the negative electrode electrolyte solution tank 1b. The positive electrode electrolyte solution tank 1a stores positive electrode electrolyte solution. The negative electrode electrolyte solution tank 1b stores negative electrode electrolyte solution. The positive electrode electrolyte solution tank 1a and the negative electrode electrolyte solution tank 1b have the same structure.

The electrolyte solution is stored in the tank body 10 in each of the positive electrode electrolyte solution tank 1a and the negative electrode electrolyte solution tank 1b. The electrolyte solution tank has the structure in which the tank body 10 has a cylindrical shape having a base part and a top part. The top part is arranged at the upper side Y2 in the vertical direction Y. The base part is arranged at the lower side Y1 in the vertical direction Y. The electrolyte solution supply part 20 is formed at the upper part of the tank body 10.

The electrolyte solution drain part 30 is formed at the base part of the tank body 10. The electrolyte solution is supplied into the interior chamber 11 of the tank body 10 through the electrolyte solution supply part 20. The electrolyte solution is drained from the interior chamber 11 to the redox flow type battery cell 50 through the electrolyte solution drain part 30. A circulation mechanism 60 is connected to the electrolyte solution supply part 20 and the electrolyte solution drain part 30 in each of the positive electrode electrolyte solution tank 1a and the negative electrode electrolyte solution tank 1b. The circulation mechanism 60 is made of a pipe member. The circulation mechanism 60 supplies the electrolyte solution stored in the positive electrode electrolyte solution tank 1a and the negative electrode electrolyte solution tank 1b to the redox flow type battery cell 50 so as to circulate the electrolyte solution into the redox flow type battery cell 50. As shown in FIG. 1, in each of the positive electrode electrolyte solution tank 1a and the negative electrode electrolyte solution tank 1b, a valve 63 is mounted at the upstream side of the electrolyte solution supply part 20, and a pump 61 is mounted at the downstream side of the electrolyte solution drain part 30.

In a usual state of the redox flow battery system 100, the electrolyte solution stored in the tank body 10 is supplied to the redox flow type battery cell 50 and is circulated in the redox flow battery system 100 through the redox flow type battery cell 50 by the circulation mechanism 60 and the pump 61.

On the other hand, in the replacement of the used electrolyte solution with the fresh electrolyte solution, the used electrolyte solution is drained through a drain part 62 to the outside of the assembly of the electrolyte solution tanks 1 (1a, 1b), and the valve 63 is opened to introduce the fresh electrolyte solution into the interior chamber 11 of the tank body 10. The drain part 62 is connected to the pump 61 in each of the positive electrode electrolyte solution tank 1a and the negative electrode electrolyte solution tank 1b. The pump 61 corresponds a suction and drain part.

As shown in FIG. 2, the flow guide mechanism 40 is arranged in the interior chamber 11 of the tank body 10.

Figure 3A:
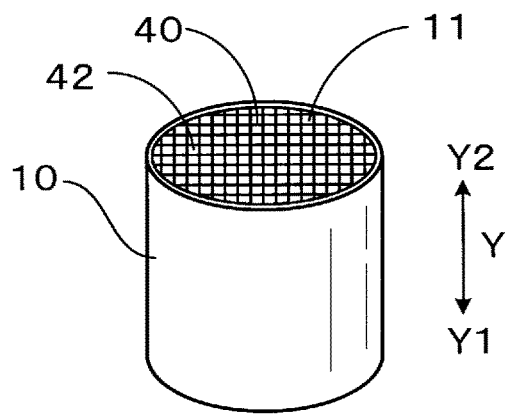
FIG. 3A is a view showing a perspective cross section of the electrolyte solution tank according to the first exemplary embodiment used in the redox flow battery system along the line III-III shown in FIG. 1.

FIG. 3A is a view showing a perspective cross section of each of the positive electrode electrolyte solution tank 1a and the negative electrode electrolyte solution tank 1b according to the first exemplary embodiment in the redox flow battery system 100 along the line III-III shown in FIG. 1. As shown in FIG. 3A, the flow guide mechanism 40 has a structure in which a plurality of electrolyte solution flow channels 42 extend in the vertical direction Y, and are arranged in a lattice arrangement shape on a cross section which is perpendicular to the longitudinal direction of each of the positive electrode electrolyte solution tank 1a and the negative electrode electrolyte solution tank 1b. That is, the vertical direction and the longitudinal direction are parallel with each other. Accordingly, the electrolyte solution flows in the interior chamber 11 of the tank body 10 along the flow direction F which is parallel with the vertical direction Y. The flow guide mechanism 40 and the tank body 10 are different members from each other. However, it is possible to assemble the flow guide mechanism 40 and the tank body 10 with a single member. The tank body 10 and the flow guide mechanism 40 are made of a material, for example made of polypropylene, which is relatively unreactive with the electrolyte solution stored in the tank body 10.

Figure 6A:
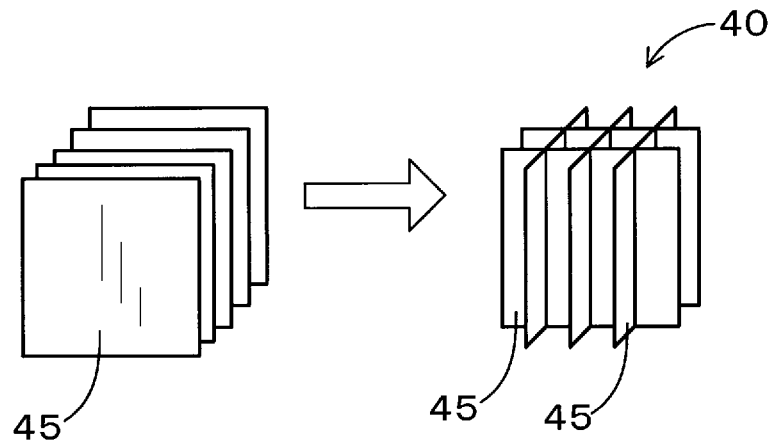
FIG. 6A to FIG. 6C are conceptual views showing a method of manufacturing the electrolyte solution tanks for the redox flow battery arranged in the redox flow battery system according to the first exemplary embodiment of the present invention shown in FIG. 1.
Figure 6B:
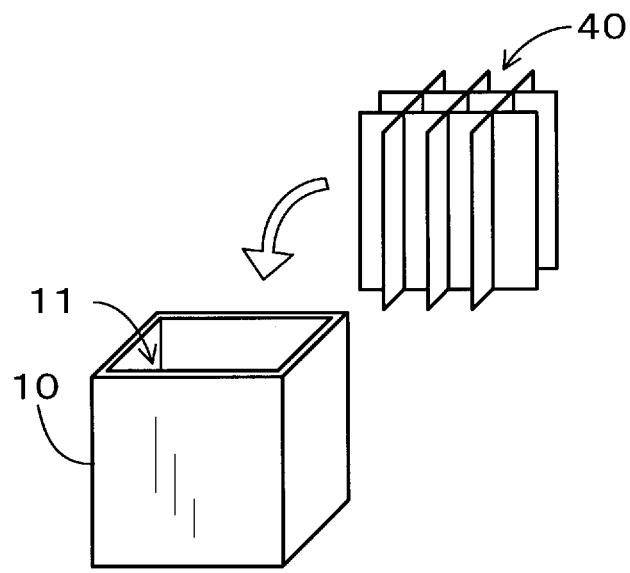
Figure 6C:
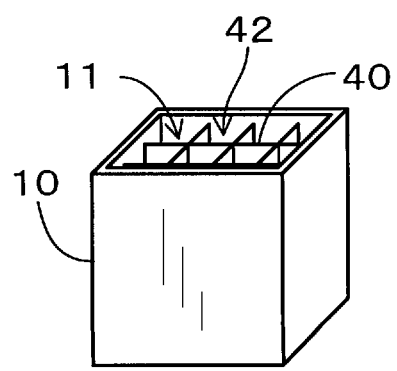

FIG. 6A to FIG. 6C are conceptual views showing a method of manufacturing the electrolyte solution tanks 1 (1a, 1b) used in the redox flow battery system 100 according to the first exemplary embodiment of the present invention shown in FIG. 1. As shown in FIG. 6A, it is possible to produce the flow guide mechanism 40 by arranging the plate members 45 in a lattice arrangement shape on a cross section which is perpendicular to the longitudinal direction of the electrolyte solution tanks 1 (1a, 1b).

As shown in FIG. 2, a cross-sectional area V of each of the electrolyte solution flow channels 42 is smaller than a cross-sectional area V0 of the interior chamber 11 in the tank body 10 on a cross section, which is perpendicular to the flow direction F which is parallel with the vertical direction Y. For example, it is acceptable to from the cross-sectional area V of the electrolyte solution flow channels 42 is within a range of ½ to 1/1000 of the cross-sectional area V0 of the interior chamber 11 in the tank body 10.

Figure 3B:
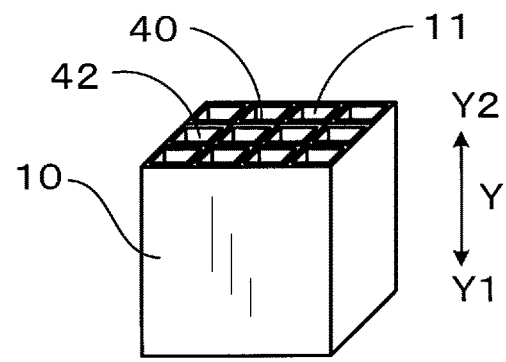
FIG. 3B is a view showing a perspective cross section of the electrolyte solution tank according to a first modification of the first exemplary embodiment along the line III-III shown in FIG. 1.

FIG. 3B is a view showing a perspective cross section of each of the positive electrode electrolyte solution tank 1a and the negative electrode electrolyte solution tank 1b according to a first modification of the first exemplary embodiment along the line III-III shown in FIG. 1.

As shown in FIG. 3B, it is acceptable for each of the positive electrode electrolyte solution tank 1a and the negative electrode electrolyte solution tank 1b to have a structure in which the tank body 10 has a rectangular tube shape having the base part and the top part, and a plurality of the electrolyte solution flow channels 42 having a square shape on a cross section which is perpendicular to the flow direction F, which is parallel with the vertical direction Y, of the electrolyte solution in the interior chamber 11.

Figure 3C:
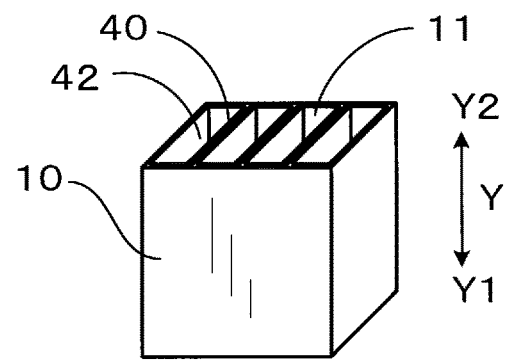
FIG. 3C is a view showing a perspective cross section of the electrolyte solution tank according to a second modification of the first exemplary embodiment along the line III-III shown in FIG. 1

FIG. 3C is a view showing a perspective cross section of each of the positive electrode electrolyte solution tank 1a and the negative electrode electrolyte solution tank 1b according to a second modification of the first exemplary embodiment along the line III-III shown in FIG. 1.

Further, as shown in FIG. 3C, it is acceptable for each of the positive electrode electrolyte solution tank 1a and the negative electrode electrolyte solution tank 1b to have a structure in which the tank body 10 has a rectangular tube shape having the base part and the top part, and a plurality of the electrolyte solution flow channels 42 having a rectangular shape, arranged in a first direction, on a cross section which is perpendicular to the flow direction F, which is parallel with the vertical direction Y, of the electrolyte solution in the interior chamber 11.

Figure 3D:
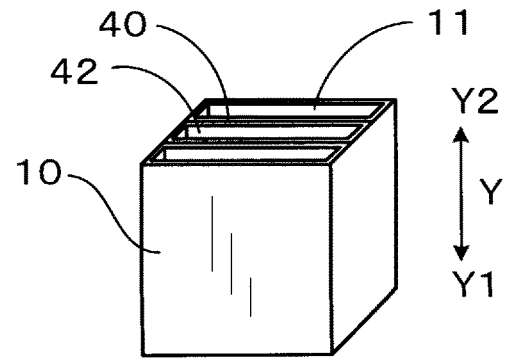
FIG. 3D is a view showing a perspective cross section of the electrolyte solution tank according to a third modification of the first exemplary embodiment along the line III-III shown in FIG. 1.

FIG. 3D is a view showing a perspective cross section of each of the positive electrode electrolyte solution tank 1a and the negative electrode electrolyte solution tank 1b according to a third modification of the first exemplary embodiment along the line III-III shown in FIG. 1.

Still further, as shown in FIG. 3D, it is acceptable for each of the positive electrode electrolyte solution tank 1a and the negative electrode electrolyte solution tank 1b to have a structure in which the tank body 10 has a rectangular tube shape having the base part and the top part, and a plurality of the electrolyte solution flow channels 42 having a rectangular shape, arranged in a second direction which is perpendicular to the first direction, on a cross section which is perpendicular to the flow direction F, which is parallel with the vertical direction Y, of the electrolyte solution in the interior chamber 11 of the tank body 10.

Still further, it is acceptable for each of the electrolyte solution flow channels 42 to have a different cross sectional shape from each other.

It is acceptable to form the flow guide mechanism 40 by using tube members 46.

Figure 4A:
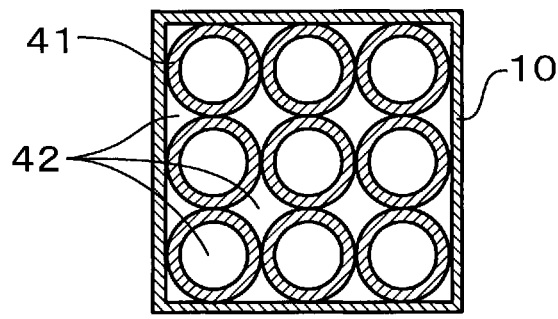
FIG. 4A is a view showing a cross section of the electrolyte solution tank according to a fourth modification of the first exemplary embodiment, along a lateral direction which is perpendicular to the longitudinal direction of the electrolyte solution tank shown in FIG. 1.

FIG. 4A is a view showing a cross section of each of the positive electrode electrolyte solution tank 1a and the negative electrode electrolyte solution tank 1b according to a fourth modification of the first exemplary embodiment, along a lateral direction which is perpendicular to the flow direction F, i.e. perpendicular to the longitudinal direction of the electrolyte solution tank shown in FIG. 1. As shown in FIG. 4A, it is acceptable to use a plurality of the tube members 46 to form the flow guide mechanism 40. In the fourth modification, each of the tube members 46 has a circular shape, on a cross section which is perpendicular to the flow direction F of the electrolyte solution in the interior chamber 11 of the tank body 10.

Figure 4B:
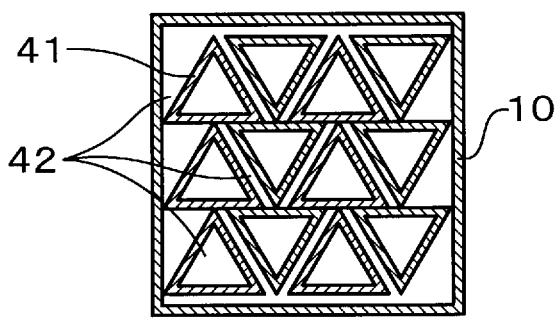
FIG. 4B is a view showing a cross section of the electrolyte solution tank according to a fifth modification of the first exemplary embodiment, along a lateral direction which is perpendicular to the longitudinal direction of the electrolyte solution tank shown in FIG. 1.

FIG. 4B is a view showing a cross section of each of the positive electrode electrolyte solution tank 1a and the negative electrode electrolyte solution tank 1b according to a fifth modification of the first exemplary embodiment, along a lateral direction which is perpendicular to the flow direction F, i.e. perpendicular to the longitudinal direction of the electrolyte solution tank shown in FIG. 1. As shown in FIG. 4B, it is acceptable to use a plurality of the tube members 46 to form the flow guide mechanism 40. In the fifth modification, each of the tube members 46-3 has a triangle shape, on a cross section which is perpendicular to the flow direction F of the electrolyte solution in the interior chamber 11 of the tank body 10.

Figure 4C:
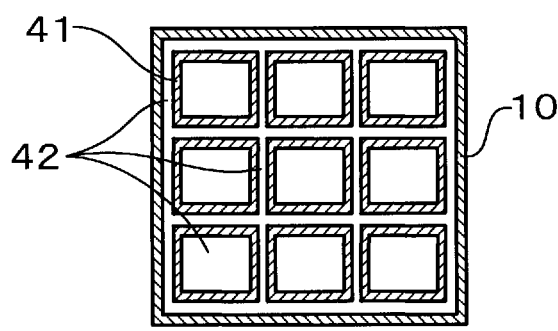
FIG. 4C is a view showing a cross section of the electrolyte solution tank according to a sixth modification of the first exemplary embodiment, along a lateral direction which is perpendicular to the longitudinal direction of the electrolyte solution tank shown in FIG. 1.
Figure 4D:
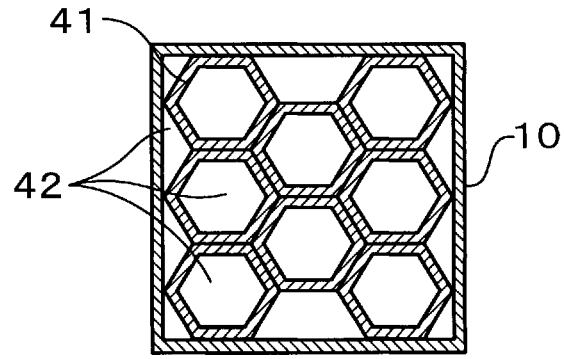
FIG. 4D is a view showing a cross section of the electrolyte solution tank according to a seventh modification of the first exemplary embodiment, along a lateral direction which is perpendicular to the longitudinal direction of the electrolyte solution tank shown in FIG. 1.

FIG. 4C is a view showing a cross section of each of the positive electrode electrolyte solution tank 1a and the negative electrode electrolyte solution tank 1b according to a sixth modification of the first exemplary embodiment, along a lateral direction which is perpendicular to the flow direction F, i.e. perpendicular to the longitudinal direction of the electrolyte solution tank shown in FIG. 1. As shown in FIG. 4C, it is acceptable to use a plurality of the tube members 46 to form the flow guide mechanism 40. In the sixth modification, each of the tube members 46 has a square shape, on a cross section which is perpendicular to the flow direction F of the electrolyte solution in the interior chamber 11 of the tank body 10. FIG. 4D is a view showing a cross section of each of the positive electrode electrolyte solution tank 1a and the negative electrode electrolyte solution tank 1b according to a seventh modification of the first exemplary embodiment, along a lateral direction which is perpendicular to the flow direction F, i.e. perpendicular to the longitudinal direction of the electrolyte solution tank shown in FIG. 1. As shown in FIG. 4D, it is acceptable to use a plurality of the tube members 46 to form the flow guide mechanism 40. In the seventh modification, each of the tube members 46 has a hexagonal shape, on a cross section which is perpendicular to the flow direction F of the electrolyte solution in the interior chamber 11 of the tank body 10.

In the structure of each of the fourth modification to the seventh modification shown in FIG. 4A to FIG. 4D, the flow guide mechanism 40 is arranged parallel to the vertical direction Y, i.e. parallel to the longitudinal direction of the tank body 10. Those improved structures make it possible to form the electrolyte solution flow channels 42 in the area between the internal area of each of the tube members 46, in the area between the adjacent tube members 46, and in the area between the tube members 46 and the tank body 10. It is also acceptable to use a plurality of honeycomb members as the tube members 46 to form the flow guide mechanism 40. In this case, one or more sub-tube members are formed in each of the honeycomb members.

It is acceptable for the flow guide mechanism 40 to have a bellows member having a bellows shape.

Figure 5A:
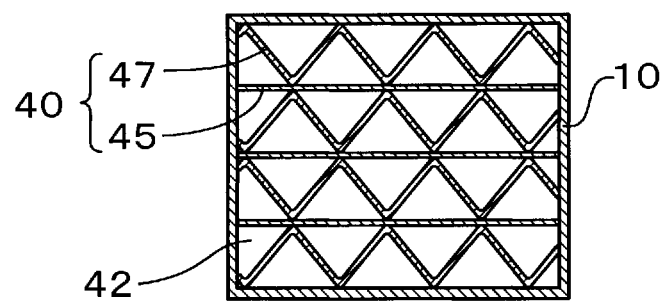
FIG. 5A is a view showing a cross section of the electrolyte solution tank according to an eighth modification of the first exemplary embodiment, along a lateral direction which is perpendicular to the longitudinal direction of the electrolyte solution tank shown in FIG. 1.

FIG. 5A is a view showing a cross section of the electrolyte solution tank 1 according to an eighth modification of the first exemplary embodiment, along a lateral direction which is perpendicular to the longitudinal direction of the electrolyte solution tank shown in FIG. 1. As shown in FIG. 5A, the flow guide mechanism 40 is composed of bellows members 47 and plate members 45. Each of the bellows members 47 is produced by bending a plate member to have a bellows shape in which peaks and valleys are alternately arranged. Each of the plate members 45 has a plate shape. In the flow guide mechanism 40, the bellows members 47 and the plate members 45 are alternately stacked and arranged in the inside of the tank body 10.

Figure 5B:
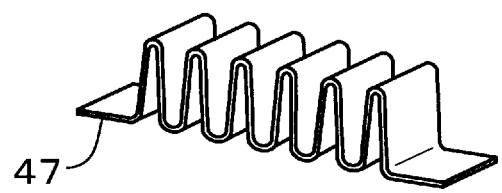
FIG. 5B is a perspective view showing a structure of a bellows member having a bellows shape used in the electrolyte solution tank according to a ninth modification of the first exemplary embodiment.

FIG. 5B is a perspective view showing a structure of a bellows member having a bellows shape used in the electrolyte solution tank 1 (1a, 1b) according to a ninth modification of the first exemplary embodiment. As shown in FIG. 5B, it is acceptable for each of the bellows members 47 to have a bellows-shaped structure in which the plate member is folded plural times to have curved tops and curved valleys.

Figure 5C:
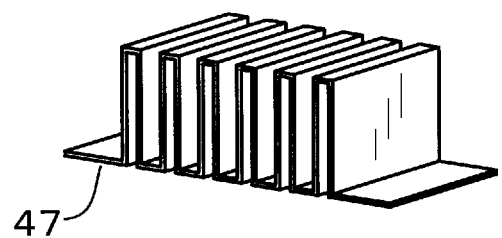
FIG. 5C is a perspective view showing a structure of the bellows member having a bellows shape used in the electrolyte solution tank according to a tenth modification of the first exemplary embodiment.

FIG. 5C is a perspective view showing a structure of the bellows member having a bellows shape used in the electrolyte solution tank 1 (1a, 1b) according to a tenth modification of the first exemplary embodiment. As shown in FIG. 5C, it is acceptable for each of the bellows members 47 to have a bellows-shape structure in which the plate member is folded plural times to have rectangle-shaped tops and rectangle-shaped valleys.

The concept of the present invention is not limited by the first exemplary embodiment and the modifications thereof previously described. For example, it is acceptable to combine one or more of the structures shown in the first exemplary embodiment and the modifications.

Next, a description will be given of a method of manufacturing the electrolyte solution tank 1 (1a, 1b) with reference to FIG. 6A, FIG. 6B and FIG. 6C.

FIG. 6A to FIG. 6C are conceptual views showing the method of manufacturing the electrolyte solution tank 1 (1a, 1b) for the redox flow battery arranged in the redox flow battery system 100 according to the first exemplary embodiment shown in FIG. 1.

As shown in FIG. 6A, a plurality of the plate members 45 are prepared. Each of the plate members 45 has a length and a width which are shorter than a depth or a length in the vertical direction Y and a width of the cross-sectional area V0 (see FIG. 2) of the interior chamber 11 in the tank body 10, respectively. A slit part (not shown) having a predetermined length is formed in each of the plate members 45. The plate members 45 with the slit parts are assembled together to produce the flow guide mechanism 40.

As shown in FIG. 6B, the flow guide mechanism 40 is arranged in the interior chamber 11 in the tank body 10. After this, as shown in FIG. 6C, a plurality of the electrolyte solution flow channels 42 are formed in the interior chamber 11 in the tank body 10 by arranging the flow guide mechanism 40 in the interior chamber 11 in the tank body 10.

A description will now be given of the procedure of replacing the used electrolyte solution with fresh electrolyte solution.

At the time to perform the replacement of electrolyte solution in the redox flow battery system 100, the electrolyte solution stored in the tank body 10 in each of the positive electrode electrolyte solution tank 1a and the negative electrode electrolyte solution tank 1b are drained through the drain parts 62 to the outside of the redox flow battery system 100 by using the pumps 61, as shown in FIG. 1.

The pumps 61 is a suction and drain part, i.e. suck the electrolyte solution from the tank bodies 10 in the positive electrode electrolyte solution tank 1a and the negative electrode electrolyte solution tank 1b, and drain the electrolyte solution through the drain parts 62 to the outside of the redox flow battery system 100.

When the interior chamber 11 in the tank body 10 has entered a reduced pressure state having a predetermined pressure, the valves 63 are open so as to introduce fresh electrolyte solution through inlet parts 64 into the interior chamber 11 in the tank body 10. As shown in FIG. 3A to FIG. 3D, the remaining electrolyte solution L1 (see FIG. 2) in the interior chamber 11 in the tank body 10 is sucked by the pumps 61, and drained through the flow guide mechanism 40 and the electrolyte solution drain parts 30 in the direction Q shown in FIG. 2.

On the other hand, as designated by the arrow P shown in FIG. 2, fresh electrolyte solution L2 is introduced into the interior chamber 11 in the tank body 10 through the electrolyte solution supply part 20 in each of the positive electrode electrolyte solution tank 1a and the negative electrode electrolyte solution tank 1b. The fresh electrolyte solution L2 is introduced and guided by the flow guide mechanism 40 toward the vertical direction Y1, i.e., in the vertically downward direction in the interior chamber 11 in the tank body 10. The fresh electrolyte solution is stored in each of the positive electrode electrolyte solution tank 1a and the negative electrode electrolyte solution tank 1b. When the overall remaining electrolyte solution L1, i.e. the old electrolyte solution has been drained to the outside of the redox flow battery system 100, the pumps 61 stop operation thereof, and the valves 63 are closed. The replacement of electrolyte solution is finished.

A description will be given of the detailed explanation of behavior and effects of the electrolyte solution tank 1 composed of the positive electrode electrolyte solution tank 1a and the negative electrode electrolyte solution tank 1b.

The electrolyte solution tank 1 has the tank body 10, and the flow guide mechanism 40 is arranged in the interior chamber 11 of the tank body 10. As shown in FIG. 2, in each of the positive electrode electrolyte solution tank 1a and the negative electrode electrolyte solution tank 1b, the flow guide mechanism 40 guides the electrolyte solution L2 supplied from the electrolyte solution supply part 20 toward the vertical direction Y1, i.e., in the vertically downward direction in the interior chamber 11 of the tank body 10, and simultaneously drains the electrolyte solution L1 stored in the tank body 10 into the electrolyte solution drain part 30. This structure makes it possible to suppress the electrolyte solution L2 (i.e. the fresh electrolyte solution) and the electrolyte solution L1 (i.e. the used electrolyte solution) from being mixed even if the draining of the electrolyte solution L1 and the supplying of the electrolyte solution L2 are performed simultaneously. It is accordingly possible for the improved structure of the electrolyte solution tank 1 (1a, 1b) to quickly replace the electrolyte solution with high efficiency.

In the structure of the electrolyte solution tank 1 according to the first exemplary embodiment and the modifications thereof, the cross-sectional area V (see FIG. 2) of each of the electrolyte solution flow channels 42 is smaller than the cross-sectional area V0 of the interior chamber 11 in the tank body 10 on a cross section, which is perpendicular to the flow direction F which is parallel with the vertical direction Y. When compared with a conventional structure without having the flow guide mechanism 40, this improved structure according to the first exemplary embodiment and the modifications makes it possible to suppress the electrolyte solution L2 supplied through the electrolyte solution supply part 20 and the electrolyte solution L1, which has been stored in the interior chamber 11 of the tank body 10, from being mixed even if the draining of the electrolyte solution L1 and the supplying of the electrolyte solution L2 are performed simultaneously.

In the structure of the electrolyte solution tank 1 according to the first exemplary embodiment and the modifications thereof, the flow guide mechanism 40 is formed by combining one or more of the plate members 45, the tube members 46 and the bellows members 47, and is arranged in the interior chamber 11 of the tank body 10 so as to divide the interior chamber 11 into a plurality of the electrolyte solution flow channels 42. This improved structure makes it possible to easily form the flow guide mechanism 40 in the interior chamber 11 of the tank body 10 in each of the positive electrode electrolyte solution tank 1a and the negative electrode electrolyte solution tank 1b.

Figure 7:
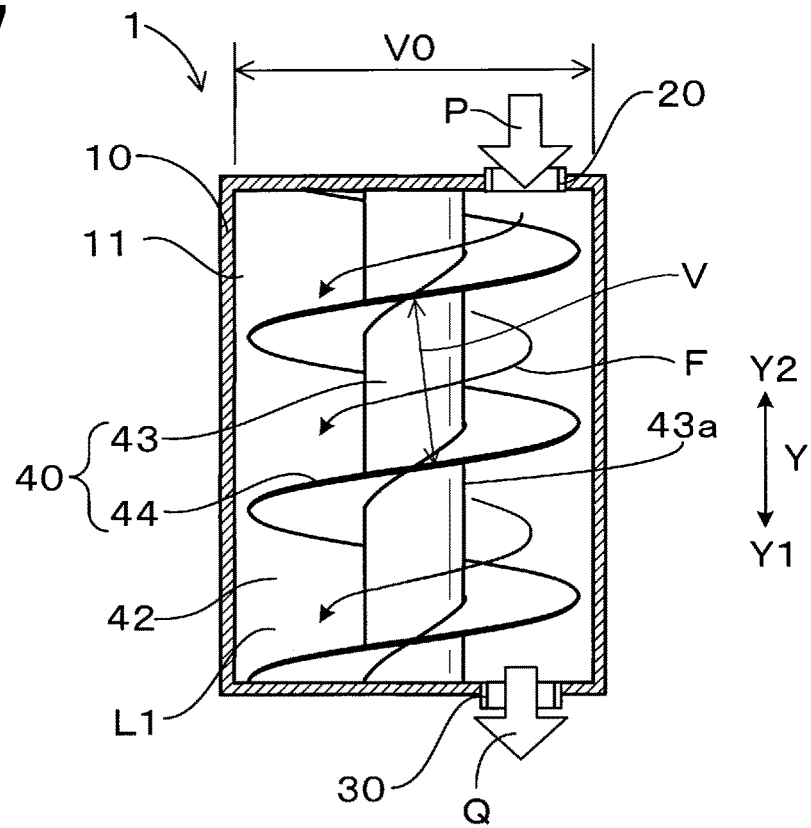
FIG. 7 is a conceptual view showing a longitudinal cross section of the electrolyte solution tank according to an eleventh modification of the first exemplary embodiment shown in FIG. 1.

FIG. 7 is a conceptual view showing a longitudinal cross section of the electrolyte solution tank 1 according to an eleventh modification of the first exemplary embodiment shown in FIG. 1.

It is acceptable for the flow guide mechanism 40 to have another structure according to the eleventh modification of the first exemplary embodiment shown in FIG. 7, instead of using the structures previously explained. In the eleventh modification shown in FIG. 7, the flow guide mechanism 40 is composed of a rod axial member 43 and a separator member 44. The separator member 44 has a screw shape and is formed on an outer peripheral surface 43a of the rod axial member 43 along the longitudinal direction Y of the rod axial member 43. The separator member 44 separates the interior chamber 11 of the tank body 10 into a plurality of sub-chambers. The rod axial member 43 has a cylindrical shape, and is arranged at the central part in the tank body 10 in each of the positive electrode electrolyte solution tank 1a and the negative electrode electrolyte solution tank 1b. The separator member 44 is arranged around the outer peripheral surface 43a of the rod axial member 43 at constant intervals to from a screw structure shown in FIG. 7.

The area separated by the separator member 44 having a screw shaped structure along the vertical direction Y (see FIG. 7) corresponds to the electrolyte solution flow channel 42 in the interior chamber 11 of the tank body 10. In this screw shaped structure shown in FIG. 7, the cross-sectional area V of the electrolyte solution flow channel 42 is smaller than the cross-sectional area V0 of the interior chamber 11 in the tank body 10 on a cross section, which is perpendicular to the flow direction F.

According to the structure of the electrolyte solution tank 1 of the eleventh modification shown in FIG. 7, it is possible to form the cross-sectional area V of the electrolyte solution flow channel 42 is smaller than the cross-sectional area V0 of the interior chamber 11 in the tank body 10 on a cross section, which is perpendicular to the vertical direction Y shown in FIG. 7. In addition to this effect, it is possible to lengthen the length of the flow direction F of the electrolyte solution flow channel 42 along the screw shaped structure in the interior chamber 11 on the tank body 10.

This improved structure makes it possible to suppress the electrolyte solution L2 (i.e. the fresh electrolyte solution) and the electrolyte solution L1 (i.e. the used electrolyte solution) from being mixed. It is accordingly possible for this improved structure of the electrolyte solution tank 1 (1a, 1b) to quickly perform the replacement of the electrolyte solution with high efficiency even if the draining of the electrolyte solution L1 and the supplying of the electrolyte solution L2 are performed simultaneously.

As previously described, the redox flow battery system 100 according to the first exemplary embodiment has the electrode electrolyte solution tank 1 (1a, 1b), i.e. the positive electrode electrolyte solution tank 1a, the negative electrode electrolyte solution tank 1b, the redox flow type battery cell 50, and the circulation mechanism 60. The circulation mechanism 60 supplies the electrolyte solution stored in the positive electrode electrolyte solution tank 1a and the negative electrode electrolyte solution tank 1b into the redox flow type battery cell 50, and circulates the electrolyte solution in the redox flow battery system 100 through the redox flow type battery cell 50, the positive electrode electrolyte solution tank 1a and the negative electrode electrolyte solution tank 1b. This suppresses the electrolyte solution L1 (as used electrolyte solution) and the electrolyte solution L2 (as fresh electrolyte solution) from being mixed together even if the replacement of the electrolyte solution is performed to drain the electrolyte solution L1 from the tank body 10 and to introduce the electrolyte solution L2 into the tank body 10 simultaneously.

The redox flow battery system 100 according to the first exemplary embodiment further has the pumps 61 capable of sucking the electrolyte solution stored in the electrode electrolyte solution tank 1 (1a, 1b) to circulate the electrolyte solution into the redox flow type battery cell 50, and capable of draining the electrolyte solution from the electrode electrolyte solution tank 1 (1a, 1b). This structure makes it possible to speedily drain the electrolyte solution from the electrode electrolyte solution tank 1 (1a, 1b) within a short period of time. Further, because this structure makes it possible to reduce the internal pressure in the interior chamber 11 of the tank body 10 while performing the drain of the electrolyte solution from the electrode electrolyte solution tank 1 (1a, 1b), this structure makes it possible to prevent leakage of the fresh electrolyte solution supplied through the electrolyte solution supply part 20 in each of the positive electrode electrolyte solution tank 1a and the negative electrode electrolyte solution tank 1b.

Figure 8:
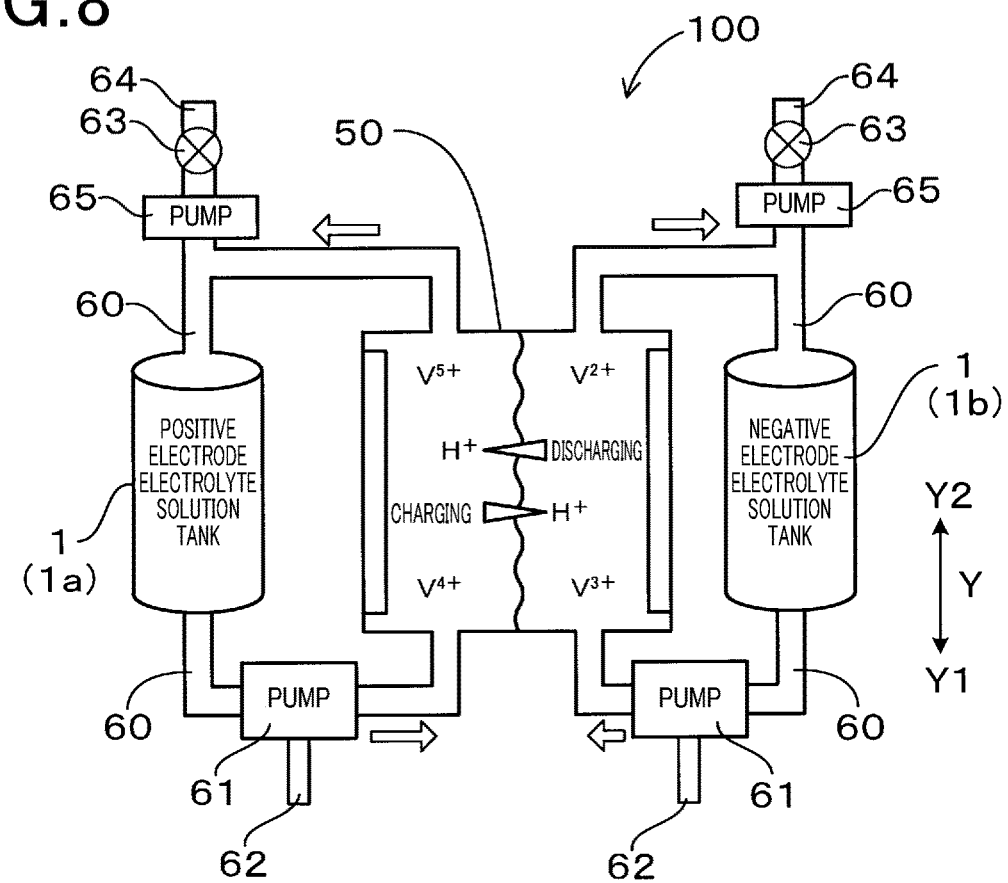
FIG. 8 is a conceptual view showing a structure of the redox flow battery system according to a twelfth modification of the first exemplary embodiment shown in FIG. 1.

FIG. 8 is a conceptual view showing a structure of the redox flow battery system 100 according to a twelfth modification of the first exemplary embodiment shown in FIG. 1.

As shown in FIG. 8, it is acceptable for the redox flow battery system 100 to further have a pump 65 in each of the positive electrode electrolyte solution tank 1a and the negative electrode electrolyte solution tank 1b. The pump 65 provides a pressure to suck the fresh electrolyte solution and to supply the fresh electrolyte solution into in each of the positive electrode electrolyte solution tank 1a and the negative electrode electrolyte solution tank 1b. The pump 65 corresponds to a pressurizing supply part.

Furthermore, as shown in FIG. 8, it is acceptable for the redox flow battery system 100 to further have a backflow prevention valve (not shown) in the circulation mechanism 60 for each of the positive electrode electrolyte solution tank 1a and the negative electrode electrolyte solution tank 1b. When the fresh electrolyte solution is supplied through the electrolyte solution supply part 20 into each of the positive electrode electrolyte solution tank 1a and the negative electrode electrolyte solution tank 1b, the pump 65 increases the pressure of the fresh electrolyte solution and supplies the fresh electrolyte solution L2 into the interior chamber 11 of the tank body 10 as designated by the arrow P shown in FIG. 2. This structure makes it possible to promote the draining of the used electrolyte solution L1 from the interior chamber 11 of the tank body 10.

As previously described in detail, the first exemplary embodiment and the various modifications thereof provide the electrode electrolyte solution tank 1 (1a, 1b) and the redox flow battery system 100 capable of performing the replacement of the electrolyte solution within a short period of time with high efficiency.

A description will be given of the structure, behavior and effects of the electrode electrolyte solution tank 1 (1a, 1b) according to a second exemplary embodiment with reference to FIG. 9 and FIG. 10.

Figure 9:
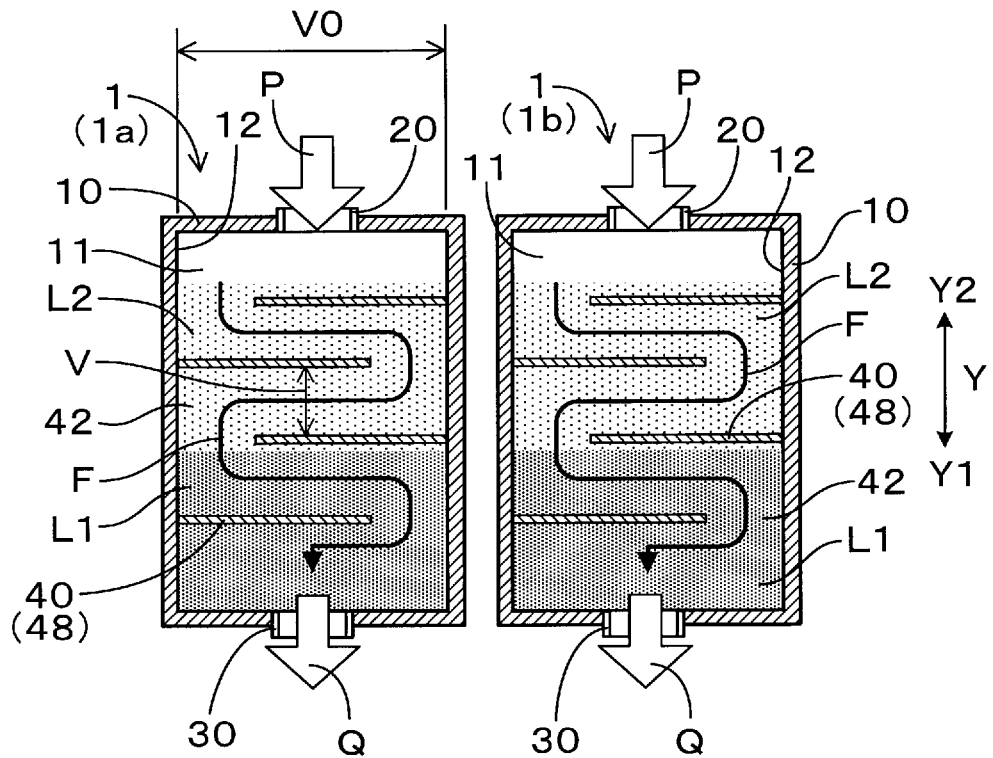
FIG. 9 is a conceptual view showing a longitudinal cross section of the electrolyte solution tank for the redox flow battery in the redox flow battery system according to a second exemplary embodiment of the present invention.

FIG. 9 is a conceptual view showing a longitudinal cross section of the electrolyte solution tank 1 (1a, 1b) for the redox flow battery in the redox flow battery system 100 according to the second exemplary embodiment of the present invention. FIG. 10 is a perspective view showing the longitudinal cross section of the electrolyte solution tank 1, i.e. the positive electrode electrolyte solution tank 1a according to the second exemplary embodiment shown in FIG. 9.

Figure 10:
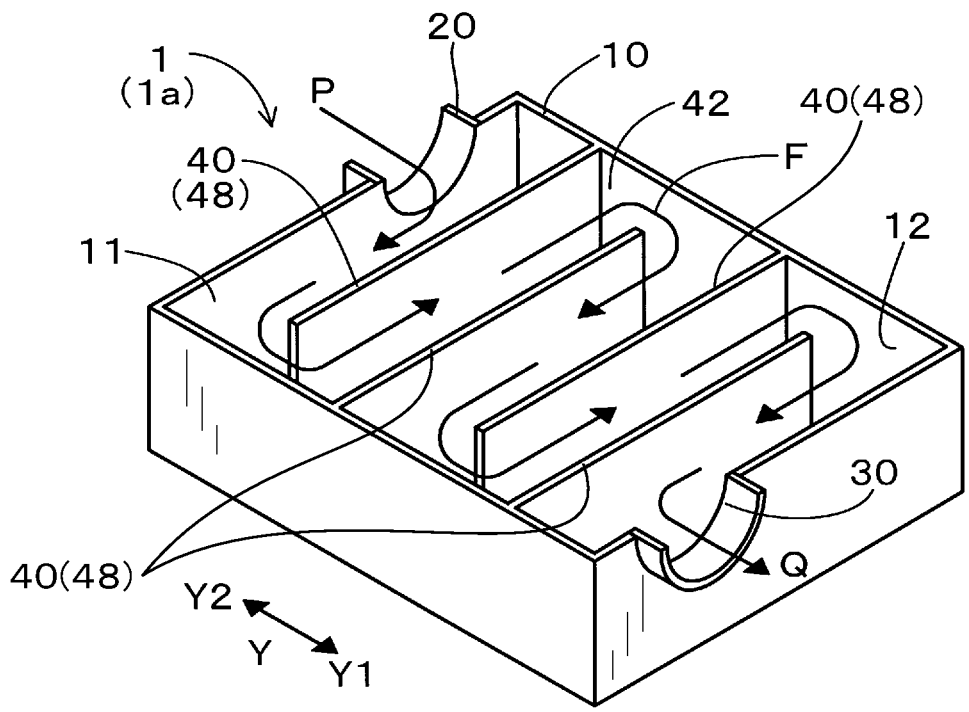
FIG. 10 is a perspective view showing the longitudinal cross section of the electrolyte solution tank according to the second exemplary embodiment shown in FIG. 9.

As shown in FIG. 9 and FIG. 10, the electrode electrolyte solution tank 1 (1a, 1b) has the flow guide mechanism 40 equipped with separator members 48. The separator members 48 are formed to project from the interior wall 12 of the tank body 10, i.e. to stand on the interior wall 12 of the tank body 10.

In the structure of the electrode electrolyte solution tank 1 (1a, 1b) according to the second exemplary embodiment, the electrolyte solution flow channel 42 is formed between the separator members 48 which are adjacent from each other, and the electrolyte solution flow channel 42 is formed between the separator member 48 and the interior wall 12 of the tank body 10. A plurality of the separator members 48 and the electrolyte solution flow channel 42 are formed in the interior chamber 11 of the tank body 10 in each of the positive electrode electrolyte solution tank 1a and the negative electrode electrolyte solution tank 1b according to the second exemplary embodiment.

As shown in FIG. 9 and FIG. 10, each of the separator members 48 is arranged in the direction which is perpendicular to the vertical direction Y. The same components between the second exemplary embodiment and the first exemplary embodiment are designated by the same reference numbers and characters. The explanation of the same components is omitted here for brevity.

The electrode electrolyte solution tank 1 (1a, 1b) according to the second exemplary embodiment has the same behavior and effects of the electrode electrolyte solution tank 1 (1a, 1b) according to the first exemplary embodiment.

In a modification of the second exemplary embodiment, it is acceptable to form the separator members 48 on the interior wall 12 of the tank body 10 so that the separator members 48 are connected together in spiral shape.

Figure 11A:
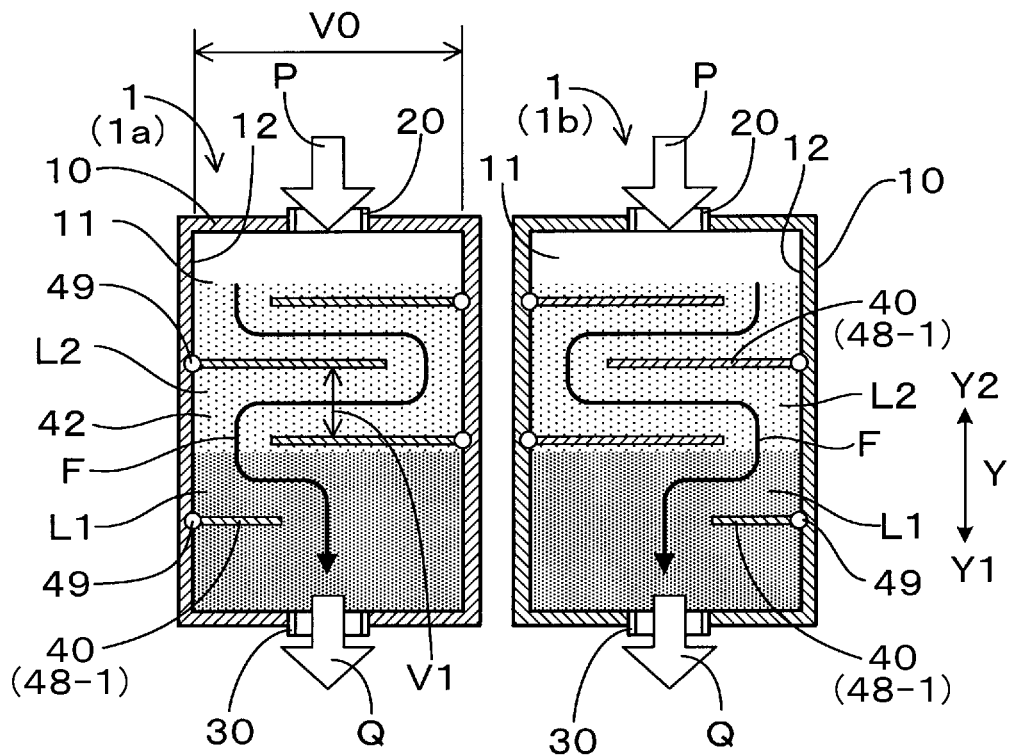
FIG. 11A is a conceptual view showing a longitudinal cross section of the electrolyte solution tanks according to a thirteenth modification when movable separator members in the electrolyte solution tanks are in a first state.
Figure 11B:
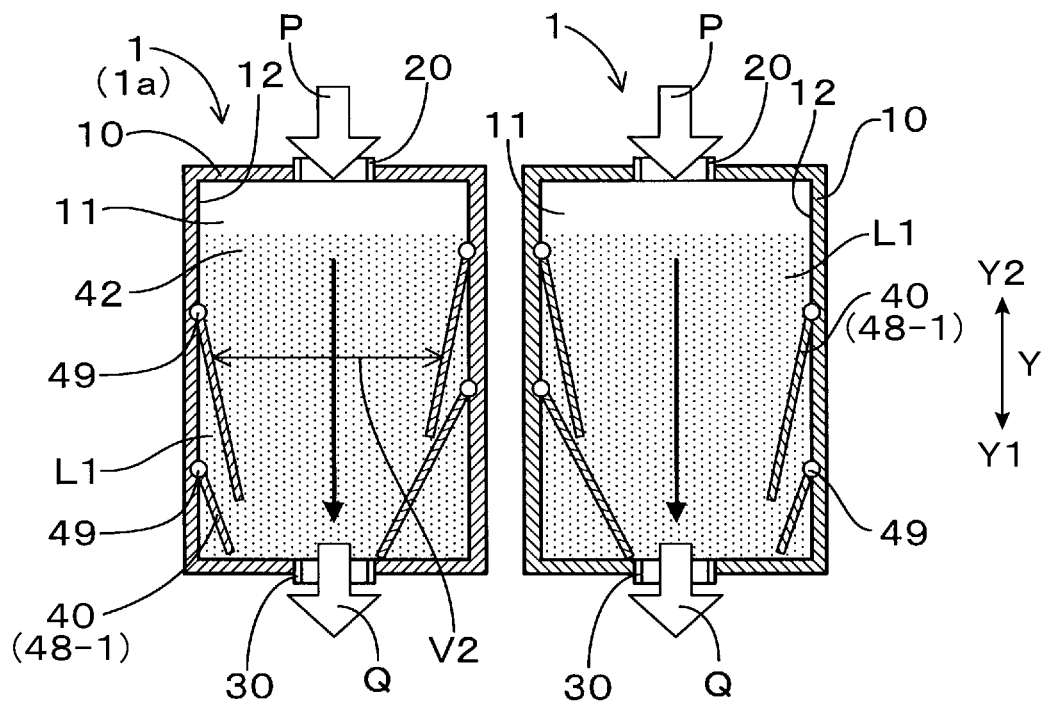
FIG. 11B is a conceptual view showing a longitudinal cross section of the electrolyte solution tanks according to the thirteenth modification when the movable separator members in the electrolyte solution tanks are in a second state.

FIG. 11A is a conceptual view showing a longitudinal cross section of the electrolyte solution tanks 1 (1a, 1b) according to a thirteenth modification when movable separator members 48-1 in the electrolyte solution tanks 1 (1a, 1b) are in a first state. FIG. 11B is a conceptual view showing a longitudinal cross section of the electrolyte solution tanks 1 (1a, 1b) according to the thirteenth modification when the movable separator members 48-1 in the electrolyte solution tanks (1a, 1b) are in a second state.

As shown in FIG. 11A and FIG. 11B, it is acceptable to use movable separator members 48-1 instead of using the separator members 48 which are fixed to the interior wall 12 of the tank body 10 shown in FIG. 9 and FIG. 10.

As shown in FIG. 11A, a switch member 49 is arranged at the connection part between the corresponding movable separator member 48-1 and the interior wall 12 of the tank body 10. That is, the electrolyte solution tanks 1 (1a, 1b) has a plurality of the switch members 49 and the movable separator members 48-1. The switch member 49 switches a first state and a second state of the corresponding movable separator member 48-1. In the first state shown in FIG. 11A, the switch member 49 allows the movable separator members 48-1 to stand on the interior wall 12 in a first direction which is perpendicular to the interior wall 12 of the tank body 10. On the other hand, in the second state shown in FIG. 11B, the switch member 49 allows the movable separator members 48-1 to stand on the interior wall 12 in a second direction which slants to the electrolyte solution drain parts 30 side. The switch member 49 switches the first state and the second state of the corresponding movable separator member 48-1. It is possible for a control part (not shown) to adjust the switching behavior of the switch member 49.

The cross-sectional area V1 of each of the electrolyte solution flow channels 42 in the first state of the movable separator member 48-1 shown in FIG. 11A, on a cross section which is perpendicular to the flow direction F of the electrolyte solution, is different from the cross-sectional area V2 of each of the electrolyte solution flow channels 42 in the second state shown in FIG. 11B. That is, the cross-sectional area V2 in the second state shown in FIG. 11B is larger than the cross-sectional area V1 in the first state of the separator member 48-1 shown in FIG. 11A.

According to the thirteenth modification shown in FIG. 11A and FIG. 11B, the movable separator members 48-1 enter the second state shown in FIG. 11B during the usual operation so as to reduce a resistance of the movable separator members 48 and to promote the supply of the electrolyte solution into the redox flow type battery cell 50.

On the other hand, the movable separator members 48-1 enter the first state shown in FIG. 11A during the replacement of the electrolyte solution. In the first state, it is possible to suppress the electrolyte solution L2 supplied through the electrolyte solution supply part 20 and the electrolyte solution L1, which has been stored in the interior chamber 11 of the tank body 10, from being mixed even if the draining of the electrolyte solution L1 and the supplying of the electrolyte solution L2 are performed simultaneously.

Similar to the effects of the second exemplary embodiment, the structure of the thirteenth modification makes it possible to speedily drain the electrolyte solution from the electrode electrolyte solution tank 1 (1a, 1b) within a short period of time.

As previously described, in the structure of the thirteenth modification shown in FIG. 11A and FIG. 11B, the switch member 49 switches the first state and the second state of each of the movable separator members 48-1 in the flow guide mechanism 40. However, the concept of the present invention is not limited by this structure. It is acceptable to use various types of the controller to switch the first state and the second state of the movable separator members 48-1.

It is acceptable for the redox flow battery system 100 to have the electrolyte solution tanks 1 (1a, 1b) according to the second exemplary embodiment or the modification thereof instead of using the electrolyte solution tanks 1 (1a, 1b) according to the first exemplary embodiment.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A redox flow battery system comprising:
   an electrolyte solution tank configured to store electrolyte solution to be supplied into and circulated through a redox flow type battery cell, the electrolyte solution tank comprising:
      a tank body having an interior chamber configured to store electrolyte solution;
      an electrolyte solution supply part configured to supply fresh electrolyte solution into the tank body;
      an electrolyte solution drain part configured to perform draining of used electrolyte solution stored in the tank body from the tank body; and
      a flow guide mechanism arranged in the interior chamber of the tank body, and configured to:
         guide the fresh electrolyte solution supplied from the electrolyte solution supply part in a vertically downward direction in the interior chamber of the tank body, and
         guide the used electrolyte solution stored in the tank body to the electrolyte solution drain part,
      wherein the tank body is structured so that the used electrolyte solution and the fresh electrolyte solution are in fluid communication with each other, and
      wherein the electrolyte solution tank is configured such that a reduced pressure generated by the draining of the used electrolyte solution stored in the tank body causes the fresh electrolyte solution supplied from the electrolyte solution supply part to be introduced into the tank body;
   a redox flow type battery cell;
   a circulation mechanism configured to supply the electrolyte solution stored in the electrolyte solution tank to the redox flow type battery cell so as to circulate the electrolyte solution in the redox flow type battery cell; and
   a suction and drain part including a pump configured to suck electrolyte solution stored in the electrolyte solution tank and a drain connected to the pump, the drain provided to drain the sucked electrolyte solution to an outside of the redox flow battery system, wherein when the interior chamber in the tank body enters a reduced pressure state generated by the draining of the used electrolyte solution stored in the tank body, a valve opens so as to introduce the fresh electrolyte solution into the tank body.

2. The redox flow battery system according to claim 1, wherein the flow guide mechanism forms a plurality of electrolyte solution flow channels in the interior chamber of the tank body, and a cross-sectional area of each of the electrolyte solution flow channels is smaller than a cross-sectional area of the interior chamber in the tank body on a cross section, which is perpendicular to a flow direction of the electrolyte solution in the electrolyte solution flow channels.

3. The redox flow battery system according to claim 2, wherein the flow guide mechanism forms the plurality of electrolyte solution flow channels in at least a part of the interior chamber of the tank body by using at least one type of a plate member, a tube member and a bellows member.

4. The redox flow battery system according to claim 2, wherein the flow guide mechanism comprises a rod axial member and a separator member, the separator member has a screw shape and is formed on an outer peripheral surface of the rod axial member long a longitudinal direction of the rod axial member so as to form the plurality of electrolyte solution flow channels in the interior chamber of the tank.

5. The redox flow battery system according to claim 2, wherein the flow guide mechanism comprises separator members, each of which stands on an interior wall of the tank body.

6. The redox flow battery system according to claim 2, wherein the flow guide mechanism is configured to switch a first state and a second state in each of the plurality of electrolyte solution flow channels, wherein the cross-sectional area of each of the plurality of electrolyte solution flow channels in the first state is different from the cross-sectional area of each of the plurality of electrolyte solution flow channels in the second state.

7. The redox flow battery system according to claim 1, wherein the flow guide mechanism forms a plurality of electrolyte solution flow channels in at least a part of the interior chamber of the tank body by using at least one type of a plate member, a tube member and a bellows member.

8. The redox flow battery system according to claim 1, wherein the flow guide mechanism comprises a rod axial member and a separator member, the separator member has a screw shape and is formed on an outer peripheral surface of the rod axial member long a longitudinal direction of the rod axial member so as to form the plurality of electrolyte solution flow channels in the interior chamber of the tank.

9. The redox flow battery system according to claim 1, wherein the flow guide mechanism comprises separator members, each of which stands on an interior wall of the tank body.

10. The redox flow battery system according to claim 1, further comprising a pressurizing supply part configured to supply pressurized electrolyte solution through the electrolyte solution supply part into the electrolyte solution tank.

* * * * *